Oct. 3, 1939.   H. L. CORWIN   2,174,854
SELF-VENTILATING BEARING ASSEMBLY
Filed Nov. 6, 1937
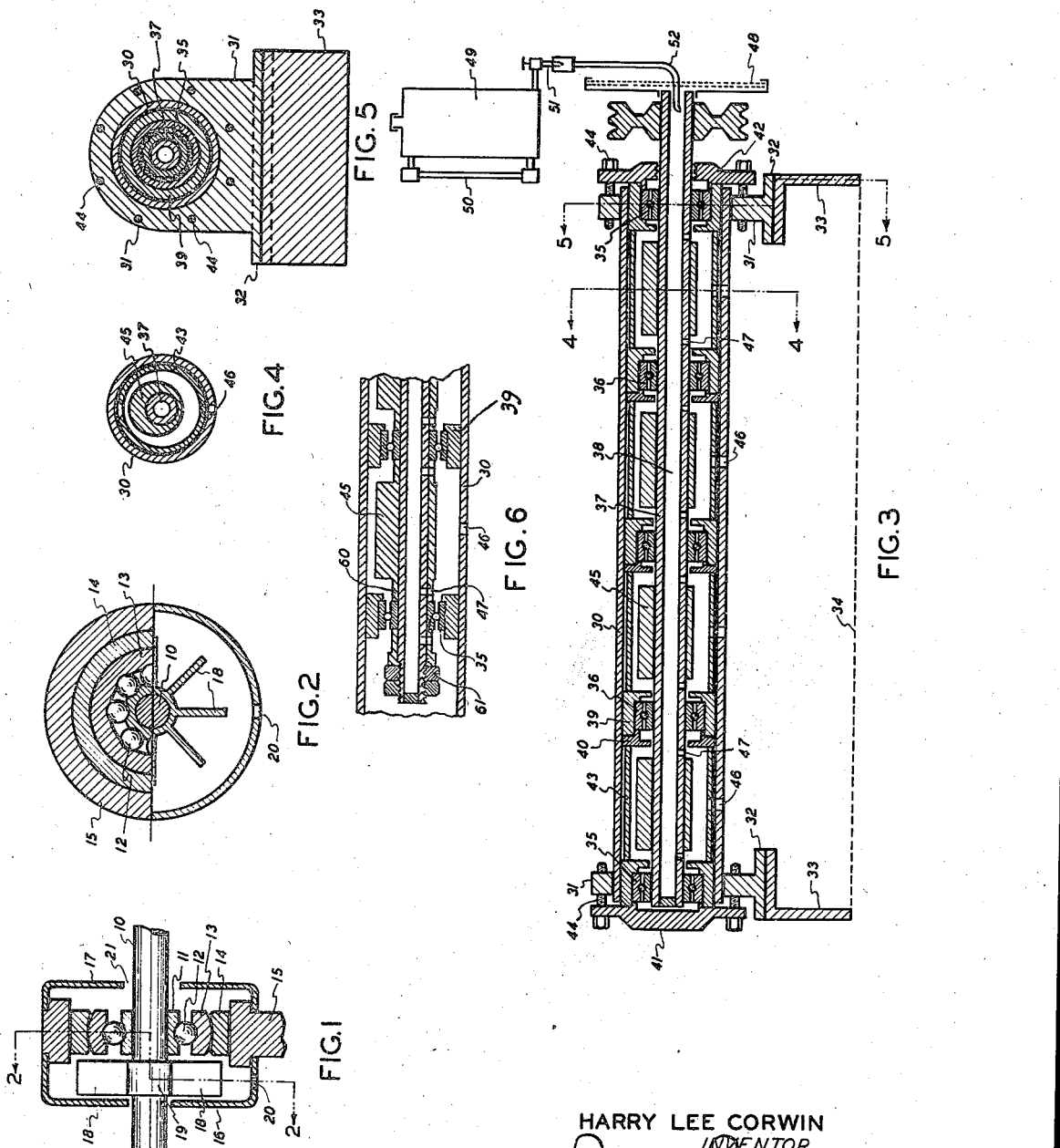
HARRY LEE CORWIN
INVENTOR
ATTORNEY Patented Oct. 3, 1939

2,174,854

UNITED STATES PATENT OFFICE 2,174,854

SELF-VENTILATING BEARING ASSEMBLY

Harry Lee Corwin, Los Angeles, Calif., assignor to Vernon Tool Co., Ltd., Los Angeles, Calif., a corporation of California Application November 6, 1937, Serial No. 173,171

5 Claims. (Cl. 308—77)

The object of the invention is to provide a self-ventilating bearing which may be operated at high speeds without undue heating.

A corollary object of the invention is to provide a bearing assembly for vibrator shafts such as are used in connection with vibrating screens, in which the self-ventilating feature is incorporated in the assembly structure.

The invention may best be explained with reference to the attached drawing, showing illustrative embodiments thereof, in which Fig. 1 illustrates in side elevation a single bearing arranged for self ventilation in the manner of the invention;

Fig. 2 is a section through the single bearing and its case as on the line 2—2 of Fig. 1;

Fig. 3 is a vertical longitudinal elevation of a vibrator shaft assembly incorporating the self ventilating feature;

Fig. 4 is a cross section of the assembly of Fig. 3 as on the line 4—4;

Fig. 5 is a section through an end of the assembly of Fig. 3, on the line 5—5, illustrated as mounted on a portion of the screen frame, and Fig. 6 illustrates in longitudinal section a fragment of a modified form of the assembly of Fig. 3.

Referring first to Figs. 1 and 2, 10 is any rotating shaft, on which is mounted a bearing which, as shown, consists of inner race 11, balls 12, outer race 13, and aligning ring 14, these elements representing any ball or roller bearing, while 15 is a fragment of any fixed support which may conveniently be provided for the bearing.

It should be said that while this description refers solely to ball or roller bearings, the self-ventilating structure described is fully applicable to plain sleeve or slip bearings having a bearing surface of bronze, babbitt, or other metal.

Around this assembly, which is entirely conventional and may be of any dimensions, I provide a housing which, in the form illustrated, consists of two cups 16 and 17 of thin sheet metal which may be passed over the ends of the shaft and retained on the bearing support by friction or in other convenient manner. One of these cups (16) closely approaches but does not touch the shaft and is relatively widely spaced from the bearing, and within this cup a vane or pair of vanes 18 is mounted on and revolves with the shaft. These vanes also may be of light sheet metal and may be mounted on a light hub or a spring ring 19 lightly gripping the shaft. The periphery of cup 16 is provided with one or more openings 20, preferably arranged on the lower side of the cup.

The opposite cup (17) may be shallower, has no openings in its periphery, but is provided with a more or less central opening which may be in the form of a mere spacing from the shaft as shown at 21, or may be a tube passing through the housing to a more or less central point.

When the shaft so provided is rotated at relatively high speed, the vanes act as blower blades, expelling air from openings 20 and aspirating a current of air through opening 21. This air current passes between and around the balls or rollers 12 and between the races and continuously withdraws the heat generated by high speeds and heavy loads.

Figs. 3 to 6 illustrate a modification of the above structure adapted to vibrator shafts as used in propelling vibrating screens. Screening devices of this type are often given a rapid vibrating motion by revolving at high speed an unbalanced shaft mounted on the screen carrying member which, in turn, is mounted on resilient members such as stiff helical springs or rubber blocks.

Such unbalanced shafts have heretofore been mounted on bearings arranged at or adjacent their ends. As they revolve at a high speed, up to 3500 to 4000 R. P. M., and carry enough unbalanced weight to move the heavy screen frame and load through an elliptical path of several hundredths of an inch, the duty on the bearings is severe in the extreme and they are subject to much heating and rapid wear.

Referring to Figs. 3, 4, and 5, 30 is a housing tube, as for example of heavy walled seamless pipe bored internally to even diameter. This tube is welded at its ends into flange rings 31—31 which in turn are welded at their lower edges to bases 32—32 which rest on the side members 33—33 of screen element 34 (indicated by the dotted line) or on a cross-member resting on the side members as may be convenient.

Within the tube I place two end bearings 35—35 and at least one intermediate bearing 36—three such intermediate bearings are shown in the drawing. All of these bearings, which are not detailed but will be understood to be ball or roller bearings and preferably two-row ball bearings of the internally self-aligning type, carry a shaft 37 which is bored throughout its length as at 38.

The inner race of each bearing is brought to a light press fit on the shaft while the outer race is brought to a press fit in a cup 39 which, in turn, is formed to a close sliding fit in tube 30. The cup 39 of each intermediate bearing is provided with a cover plate 40 and each the cover plate and the cup is provided with a shoulder which may bear against the edge of the bearing outer race, as shown, or may leave a small clearance for endwise travel of the bearing in case of differential expansion of shaft and housing. The ends of the tube are closed by cap plates 41 and 42, the latter being centrally bored to pass the driven end of shaft 37.

Between the cup of each bearing and the cover plate of the cup next to it in order I place a spacer 43, these spacers being sections of pipe having an external diameter slightly less than the internal diameter of tube 30 and having squared ends. The cap plates 41 and 42 are drawn toward flanges 31—31 by a plurality of bolts 44 and when these bolts are tightened, the spacers cause each cup to be firmly pressed against its cover plate. The entire row of cups and cover plates is thus firmly held and positioned while in service but is available for ready withdrawal as a unit from either end of the tube on removal of one of the cap plates, and each unit of cup and cover plate provides a socket in which the outer race is retained radially while it may be left free to move laterally if desired. It will be evident that each cup may be formed on the end of and integral with one of the spacers.

The unbalanced weights 45 rotate within spacers 43 and are attached to the shaft by means of keys and keyways or of set screws, not shown.

In the variant of the above construction shown in Fig. 6 the inner races of the bearings are a slip fit on the shaft and the ends of the unbalanced weights are so extended, as at 60, as to bear against the edges of these races and thus space them, the assembly being retained by a shoulder, not shown, formed on one end of the shaft and a jam nut 61 on the other end. In this form the spacers 43 are omitted and the vent holes 47 are carried through the wall of the hollow shaft and the projecting ends of the unbalanced weights 45. The cups 40 are omitted and the outer races of bearing 36 are a press fit in cups 39 which are a close slip fit in housing tube 30.

Intermediate the bearings, the spacers and also the housing tube 30 are provided with openings 46, which may register as shown in Fig. 3 or be oppositely disposed as shown in Fig. 4. The hollow shaft is also provided, in the parts between the bearing housings and the unbalanced weights with openings 47, preferably directed oppositely from the major projection of the weights. These openings may be in the position shown or may be within the bounds of cups 39 to introduce oil more directly to the bearings. These weights, all projecting toward one side of the shaft, have the same effect as the vanes 18 of Fig. 1 in aspirating a current of air into the hollow shaft and expelling it from the housing through openings 46. This air current is found in practice very materially to lower the operating temperature of the system, a drop of 60° F. or more from the operating temperature with the air intake plugged being observed when it is again opened.

As it is obviously undesirable to draw atmospheric dust into the housing, from which it would enter the bearings, an air filter of any preferred form is indicated at 48 as independently supported adjacent the end of shaft 37. It is also desirable to provide for the continuous lubrication of the bearings by means of an oil reservoir 49 having a gauge glass 50 and a sight feed drip 51 arranged to deliver oil to bore 38 by means of a tube 52 passing through the center of the air filter. It has been found that oil introduced in this manner, as an occasional drop, forms a slowly advancing film in bore 38 and is distributed between the various openings 47 with unexpected evenness, entering the compartments of the housing as a mist which penetrates and lubricates the bearings with a trifling oil consumption and without danger of overoiling.

In the attached claims the term "frictionless" bearing is used generically to include ball and roller bearings.

I claim as my invention:

1. A vibrator bearing assembly comprising: a tubular fixed housing and a shaft axially arranged therein, said housing having peripheral air vents and said shaft having a longitudinal channel and ports affording communication through said channel between the atmosphere and the interior of said housing; a plurality of weights eccentrically projecting from said shaft and revolving therewith within said housing; a bearing supporting each end of said shaft adjacent the ends of said housing and at least one intermediate bearing interposed between two of said weights, and means for positioning and retaining said bearings within said housing.

2. An assembly substantially as and for the purpose set forth in claim 1, in which said positioning and spacing means includes a cup surrounding the outer race of each said bearing and slidably fitted within said housing; tubular spacers interposed between said cups, and means for exerting longitudinal pressure within said housing to draw the ends of said spacers against the sides of said cups.

3. An assembly substantially as and for the purpose set forth in claim 1, including an air filter arranged in the path of air flow entering said longitudinal channel.

4. An assembly substantially as and for the purpose set forth in claim 1, in which said ports are positioned adjacent said bearings and including means for continuously introducing lubricating oil into the air-inlet end of said longitudinal channel.

5. In combination with a bearing: a shaft supported by said bearing, said shaft having a longitudinal channel therein and a port communicating with said channel; a fixed housing enclosing a body of air admitted by said port to circulate through the bearing, said housing having a substantially peripheral opening for the escape of air, and an air engaging and circulating member projected from at least one side of said shaft and arranged to revolve therewith within said housing.

HARRY LEE CORWIN.